June 1, 1926.
S. S. MATTHES
1,586,758
CONDUCTOR SUPPORT
Filed July 1, 1925
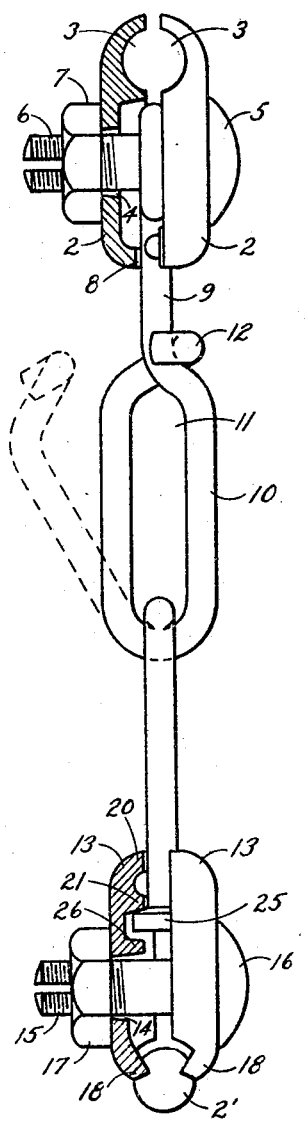
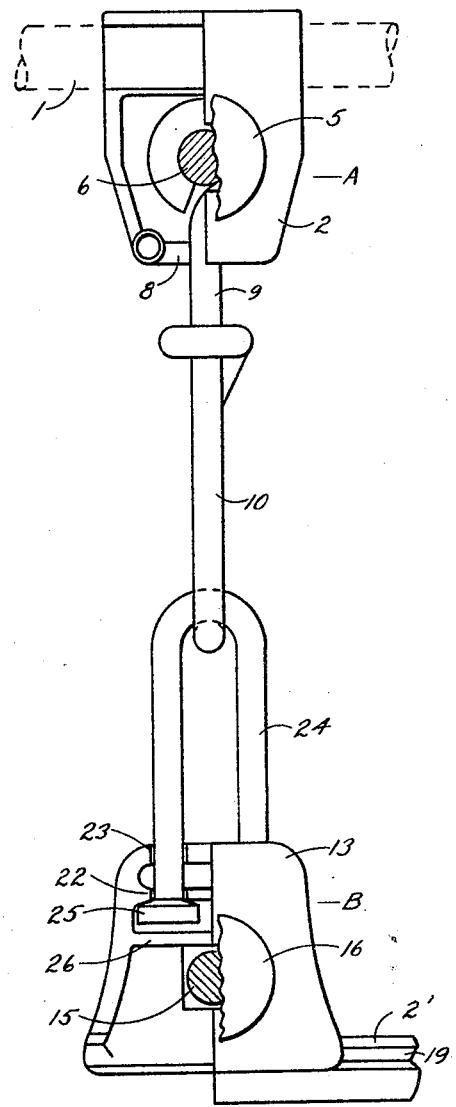
Fig. 2
Fig. 1
Witness:
W. H. DeGraff
Inventor
Samuel S. Matthes
By
Attorney Patented June 1, 1926.

1,586,758

UNITED STATES PATENT OFFICE.

SAMUEL S. MATTHES, OF MANSFIELD, OHIO, ASSIGNOR TO THE OHIO BRASS COMPANY, OF MANSFIELD, OHIO, A CORPORATION OF NEW JERSEY.

CONDUCTOR SUPPORT.

Application filed July 1, 1925. Serial No. 40,815.

My invention relates to a hanger for suspending a trolley wire from an overhead support and has particular reference to what is known as a catenary form of construction in which the trolley wire is suspended from a cable looped to conform to a catenary curve.

The object of my invention is to provide a suspension device which will grip the messenger cable and the trolley conductor and hold the same in a flexible position relative to each other. By a hanger of this nature the passage of the current collector back and forth in contact with the trolley wire will cause the trolley wire to rise and fall with the upward pressure of the current collector, and the flexibility of the hanger will, therefore, avoid the presence of what is known as hard spots which occur when the movement of the trolley wire upwardly with the passage of the current collector is prevented. My invention will also permit the longitudinal movement of the trolley wire relative to the messenger cable and this will prevent a stress upon the parts of the hanger or its connection to the messenger cable and the trolley wire.

My invention resides in the new and novel construction, combination and relation of the various parts hereinafter more fully described and shown in the accompanying drawings.

In the drawing:—

Fig. 1 is a side view in partial section of my invention.

Fig. 2 is an edgewise view in partial section of Fig. 1.

In the preferred embodiment of my invention I have shown a cable 1 which is representative of a catenary cable from which the trolley wire 2 is supported. Secured to the cable 1, which may be solid or stranded, I secure a clamp A which comprises two duplicate clamping members 2 each provided with a groove 3 which cooperate with each other to form means to receive the cable 1 and to grip the same. The clamping members 2 are each provided with registering transverse openings 4 to receive the bolt 5. The bolt 5 is provided with a threaded shank 6 upon which is threadedly mounted a nut 7 and by means of the nut and bolt the parts 2 are drawn together and held in gripping relation with respect to the messenger cable 1. The edge of the clamping members 2 at the opposite end from the groove 3 are cut away to provide an elongated slot 8 through which passes the support rod 9 and which is provided with an eye formed up out of the end of the rod 9 to receive the bolt shank 6 and the slot 8 being elongated and its side walls not engaging the rod 9, the rod 9 is free to pivot about the bolt 6.

The connecting rod 9 is formed with an elongated link 10 which forms an elongated eye 11 in a vertical direction.. The link 10 is so arranged that it may be sprung to a closed or open position by means of the hook shaped end 12. In the drawing, Fig. 2, the link is shown in a closed position in full lines and in an open position in the dotted lines.

Secured to the trolley wire 2 is a clamp B comprising two clamping members 13. The clamping members are provided with registering transverse openings 14 through which pass the threaded shank 15 of the bolt 16 and mounted upon the shank 15 is a nut 17 for drawing the clamping members 13 into and holding them in secure engagement with the trolley wire 2. The lower edge of the clamping members 13 are provided with lips 18 which engage the grooves 19 of the conductor 2. The clamping members 13 opposite the lips 18 are provided with two inwardly projecting flanges 20 and 21 which are spaced apart and are provided with transverse grooves 22 and 23 respectively to receive the U-shaped support rod 24.

The transverse grooves 22 and 23 fit the rod 24 fairly snugly so that there is a very limited amount of relative movement of the clamp B with respect to the support 24. The branches of the support 24 are each provided with an enlarged head 25 formed up out of the ends of the branches and these heads engage the flange 22 to prevent the support 24 pulling out of the clamp B and to prevent the upward movement of the clamp B relative to the support 24 beyond a limited amount, there is provided an inwardly projecting flange 26 which permits a limited amount of vertical movement of the clamp B relative to the rod 24.

The members 9 and 24 are linked together and it will be evident that the construction shown will permit of considerable vertical relative movement of the clamp B with respect to the clamp A and this movement is of decided advantage, as already pointed out.

It will be readily understood that the clamp A and its support rod 9 may be installed upon the cable 1 and the clamp B and its support rod installed upon the trolley wire independent of each other if so desired, and then the member 24 interlinked with the member 10 and the link 10 closed, as shown in Fig. 2, or the clamps A and B with their support rods 9 and 24 may be linked together and installed in that condition upon the cable and trolley wire. The heads 25 are sufficiently large so that the nut 17 may be loosened to receive or eject the trolley wire 2 without the disengagement of the clamp B from the support 24 and the connection of the member 9 with the clamp A is such that it will not be disconnected from the clamp A when installing or disconnecting from the cable 1.

It will be evident to those skilled in the art that modifications may be made from the disclosure herein, but I do not wish to be limited other than by my claims.

I claim:

1. A suspension device comprising a pair of spaced clamps each comprising a pair of members and each provided with holding means to move the members toward each other and into engagement with conductors and hold the members in said engagement, a hanger pivotally connected to one clamp and interlinked with a hanger secured to the other clamp in a substantially rigid relation and means on each clamp to receive and grip the conductors.

2. A suspension device comprising a pair of spaced clamps each comprising a pair of members and each provided with holding means to move the members towards each other and into engagement with conductors and hold the members in said engagement, a hanger pivotally connected to one clamp to move in a direction only corresponding with its conductor, a hanger interlinked with the first hanger and fully movable relative thereto in all directions except one maintaining the clamps against separation beyond a predetermined amount and held substantially rigid between the members of the other clamp and means on each clamp to receive and grip the conductors.

3. A suspension device comprising a pair of spaced clamps each consisting of a pair of members provided with means to receive and engage spaced conductors, a pair of linked means connecting the clamps and limiting the separation of the conductors but permitting free movement in all other directions, one means pivotally held between the members of one clamp and means to hold the members and said means in said relation and the members clamped to their conductor, the other means held between the members of the other clamp in substantial rigid relation and means to hold the said members and means in said relation and the members clamped to their conductor.

4. A suspension device comprising a trolley wire clamp and a suspension member for the clamp having depending extremities with projections at the ends to be engaged by the clamp to limit the relative longitudinal movement of the member and clamp away from each other, suspension means interlinked with the suspension member and engaged by a clamp provided with means to engage a supporting cable and means on the suspension means to permit the suspension member and means to be interlinked or disengaged at will.

In testimony whereof I affix my signature.

SAMUEL S. MATTHES.